(12) United States Patent
Takeuchi et al.

(10) Patent No.: US 11,578,686 B2
(45) Date of Patent: Feb. 14, 2023

(54) ENGINE SYSTEM

(71) Applicant: KABUSHIKI KAISHA TOYOTA JIDOSHOKKI, Kariya (JP)

(72) Inventors: Yoshitaka Takeuchi, Aichi-ken (JP); Hidehito Kubo, Aichi-ken (JP); Shohei Matsumoto, Aichi-ken (JP); Norinosuke Nakatani, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/606,521

(22) PCT Filed: May 26, 2020

(86) PCT No.: PCT/JP2020/020640
§ 371 (c)(1),
(2) Date: Oct. 26, 2021

(87) PCT Pub. No.: WO2020/241604
PCT Pub. Date: Dec. 3, 2020

(65) Prior Publication Data
US 2022/0205415 A1    Jun. 30, 2022

(30) Foreign Application Priority Data

May 29, 2019  (JP) .............................. JP2019-100515
Mar. 19, 2020 (JP) .............................. JP2020-049661

(51) Int. Cl.
*F02M 27/02* (2006.01)
*F02M 21/02* (2006.01)
(Continued)

(52) U.S. Cl.
CPC ........ *F02M 27/02* (2013.01); *F02M 21/0206* (2013.01); *F01N 3/0842* (2013.01);
(Continued)

(58) Field of Classification Search
CPC .... F02M 21/0206; F02M 25/12; F02M 26/36; F02M 27/02; F01N 2240/30;
(Continued)

(56) References Cited

U.S. PATENT DOCUMENTS 4,131,086 A * 12/1978 Noguchi ................ F02M 27/02
123/3
4,416,224 A * 11/1983 Hobby ................... F02M 27/02
123/3
(Continued)

FOREIGN PATENT DOCUMENTS

JP      2006052662 A * 2/2006
JP      2006118488 A * 5/2006
(Continued)

OTHER PUBLICATIONS

Office Action dated Mar. 9, 2022 in Indian Application No. 202147053575.

Primary Examiner — John M Zaleskas
(74) Attorney, Agent, or Firm — Sughrue Mion, PLLC

(57) ABSTRACT

An engine system includes: an ammonia engine; a reforming device that has a reforming catalyst for cracking ammonia gas into hydrogen and configured to reform ammonia gas to generate reformed gas containing hydrogen; and a control unit. The control unit includes: a purge controller configured to control a reforming injector so as to be closed and control a reforming throttle valve so as to be opened, after an ignition switch gives an instruction of a stop of the ammonia engine; and an engine stop controller configured to control main injectors so as to be closed, after the ignition switch gives the instruction of the stop of the ammonia engine.

11 Claims, 9 Drawing Sheets

(51) Int. Cl.
  *F01N 3/08*  (2006.01)
  *F02D 19/06*  (2006.01)
(52) U.S. Cl.
  CPC ...... *F01N 2240/30* (2013.01); *F02D 19/0644* (2013.01); *F02D 19/0692* (2013.01)
(58) Field of Classification Search
  CPC ............. F02D 19/0644; F02D 19/0671; F02D 19/0692; F02D 41/0025
  See application file for complete search history.

(56) References Cited

U.S. PATENT DOCUMENTS

| | | | | |
|---|---|---|---|---|
| 4,478,177 | A * | 10/1984 | Valdespino | F02B 43/10 123/3 |
| 4,480,595 | A * | 11/1984 | Hobby | F02M 25/12 123/3 |
| 6,715,452 | B1 * | 4/2004 | Taylor, III | F02M 21/0206 123/3 |
| 8,151,779 | B1 * | 4/2012 | Hagiwara | F02D 19/0665 123/575 |
| 8,370,049 | B1 * | 2/2013 | Shimizu | F02D 19/0671 123/304 |
| 2004/0144337 | A1 * | 7/2004 | Wakao | F02M 25/12 123/3 |
| 2005/0045118 | A1 * | 3/2005 | Wakao | F02M 27/02 123/3 |
| 2007/0183939 | A1 * | 8/2007 | Hotta | F02D 19/08 700/266 |
| 2008/0091328 | A1 * | 4/2008 | Tabata | F02D 9/00 701/102 |
| 2008/0257301 | A1 * | 10/2008 | Hotta | F02D 19/0676 123/3 |
| 2010/0212611 | A1 * | 8/2010 | Yahagi | F02M 25/12 123/3 |
| 2010/0224141 | A1 * | 9/2010 | Nakada | F02D 19/0671 123/3 |
| 2010/0300382 | A1 * | 12/2010 | Yahagi | C01B 3/384 123/3 |
| 2011/0137537 | A1 * | 6/2011 | Leone | F02D 19/0628 123/3 |
| 2011/0283684 | A1 * | 11/2011 | Aso | F02D 41/123 60/285 |
| 2011/0283959 | A1 * | 11/2011 | Aso | F01N 3/30 123/3 |
| 2011/0283960 | A1 * | 11/2011 | Hikazudani | C01B 3/047 123/3 |
| 2012/0040261 | A1 * | 2/2012 | Nakanishi | B01J 8/0438 123/3 |
| 2012/0167840 | A1 * | 7/2012 | Miyagawa | F02D 19/0671 422/111 |
| 2012/0167850 | A1 | 7/2012 | Christgen | |
| 2013/0025547 | A1 * | 1/2013 | Nakagawa | F02M 25/12 123/3 |
| 2013/0266506 | A1 * | 10/2013 | Hikazudani | C01B 21/26 423/658.2 |
| 2013/0300007 | A1 * | 11/2013 | Fuse | F02M 21/0206 261/136 |
| 2013/0333639 | A1 * | 12/2013 | Hoshino | F02M 27/02 123/3 |
| 2014/0311135 | A1 * | 10/2014 | Miyagawa | F02D 41/0025 60/287 |
| 2014/0311428 | A1 * | 10/2014 | Miyagawa | F01N 3/106 123/3 |
| 2015/0075451 | A1 * | 3/2015 | Inuzuka | F02B 43/12 123/3 |
| 2017/0320482 | A1 * | 11/2017 | Leone | B60K 13/04 |
| 2017/0333843 | A1 * | 11/2017 | Aoyagi | F02M 26/36 |
| 2018/0230959 | A1 * | 8/2018 | Hayashima | F02P 5/1502 |
| 2019/0153965 | A1 * | 5/2019 | Asai | F02M 21/02 |
| 2019/0226410 | A1 * | 7/2019 | Asai | F02M 25/00 |
| 2019/0234354 | A1 * | 8/2019 | Asai | F02M 31/083 |

FOREIGN PATENT DOCUMENTS

| | | | |
|---|---|---|---|
| JP | 2007187111 A | * | 7/2007 |
| JP | 2008063996 A | * | 3/2008 |
| JP | 2009097425 A | * | 5/2009 |
| JP | 2013234079 A | * | 11/2013 |
| JP | 2013237580 A | * | 11/2013 |
| JP | 2013237581 A | * | 11/2013 |
| JP | 2014-211155 A | | 11/2014 |
| JP | 2015218644 A | * | 12/2015 |
| JP | 2018076214 A | * | 5/2018 |
| WO | 2012/090739 A1 | | 7/2012 |

* cited by examiner

ENGINE SYSTEM

CROSS REFERENCE TO RELATED APPLICATION

This application is a National Stage of International Application No. PCT/JP2020/020640 filed on May 26, 2020, claiming priorities based on Japanese Patent Application No. 2019-100515 filed on May 29, 2019, and Japanese Patent Application No. 2020-049661 filed on Mar. 19, 2020, the contents of all of which are incorporated herein by reference in their entirety.

TECHNICAL FIELD

The present invention relates to an engine system.

BACKGROUND ART

As a conventional engine system, for example, a technique disclosed in Patent Literature 1 has been known. The engine system disclosed in Patent Literature 1 includes: an engine main body; an engine intake passage and an engine exhaust passage connected to a combustion chamber of the engine main body; a throttle valve disposed inside the engine intake passage; an ammonia injection valve that injects gaseous ammonia toward the engine intake passage; a cracker that cracks gaseous ammonia with a catalyst to generate hydrogen; an ammonia supply pipe that supplies gaseous ammonia to the cracker; an air supply pipe that is connected to the engine intake passage and supplies air to the cracker; and an outlet pipe that is connected to the engine intake passage and from which gas containing hydrogen generated by the cracker flows out.

CITATION LIST

Patent Literature

Patent Literature 1: Domestic Re-publication of PCT International Application No. JPWO2012-090739

SUMMARY OF INVENTION

Technical Problem

However, the above-described prior art has the following problems. That is, when gaseous ammonia is reformed in the cracker (reformer), a part of ammonia is combusted, and then such combustion heat is used to dissociate the rest of ammonia. This can extract reformed gas containing hydrogen. At this time, reformed gas may contain steam. When steam remains in a reformer passage, the steam is cooled and condensed when the engine stops. When steam remaining in the reformer passage is condensed, the function of a catalyst may be deteriorated due to water submersion of the catalyst in the reformer, or the passage of reformed gas may be blocked due to freezing of water under a freezing point condition.

An object of the present invention is to provide an engine system that can prevent condensation of steam remaining in a reformer passage when an engine stops.

Solution to Problem

An engine system according to one aspect of the present invention includes: an engine; an intake passage through which air to be supplied to the engine flows; a fuel injection valve configured to inject a fuel toward the engine; a first throttle valve disposed in the intake passage and configured to control a flow rate of the air to be supplied to the engine; a reformer that has a catalyst for cracking the fuel into hydrogen and configured to reform the fuel to generate reformed gas containing hydrogen; an air flow passage through which air to be supplied to the reformer flows; a fuel supply valve configured to supply the fuel to the reformer; a second throttle valve disposed in the air flow passage and configured to control the flow rate of the air to be supplied to the reformer; a reformed gas flow passage through which the reformed gas generated by the reformer flows toward the engine; a stop instruction member configured to give an instruction of a stop of the engine; and a control unit configured to control the fuel injection valve, the first throttle valve, the fuel supply valve and the second throttle valve, wherein the control unit includes: a first controller configured to execute a control process in which one of the fuel supply valve and the second throttle valve is closed, and the other one of the fuel supply valve and the second throttle valve is opened, after the stop instruction member gives the instruction of the stop of the engine; and a second controller configured to execute a control process in which the fuel injection valve is closed, after the stop instruction member gives the instruction of the stop of the engine.

In this engine system, after the instruction of the stop of the engine, one of the fuel supply valve and the second throttle valve is controlled so as to be closed and also the other one of the fuel supply valve and the second throttle valve is controlled so as to be opened, so that almost only air or almost only fuel flows through the inside of the reformer and the reformer passage, which is the reformed gas flow passage. Therefore, the inside of the reformer passage is purged by air or fuel. In addition, after the instruction of the stop of the engine, the fuel injection valve is controlled so as to be closed, so that the supply of fuel to the engine is stopped. Thus, the engine stops. As such, at a stop of the engine, steam does not exist in the reformer passage because the inside of the reformer passage is purged. This can prevent condensation of steam remaining in the reformer passage.

The second controller may execute the control process in which the fuel injection valve and the first throttle valve are closed, and the other one of the fuel supply valve and the second throttle valve is closed, after the first controller executes the control process.

In this configuration, supply of fuel or air to the reformer is stopped after the instruction of the stop of the engine. Therefore, the inside of the reformer passage is purged by air or fuel. After that, supply of fuel and air to the engine is stopped, and also supply of air or fuel to the reformer is stopped. Thus, the engine stops. Since the engine is stopped after purging of the inside of the reformer passage in this manner, condensation of steam remaining in the reformer passage is prevented without discomfort of a driver in a vehicle.

The engine system further includes a temperature detector configured to detect a temperature of the reformer, wherein the control unit includes a third controller configured to execute a control process in which the fuel supply valve and the second throttle valve are controlled such that amounts of fuel and air to be supplied to the reformer are reduced, when the stop instruction member gives the instruction of the stop of the engine, before each of the first controller and the second controller executes the corresponding control process, the first controller may execute the control process in which the fuel supply valve is closed and the second throttle valve is opened when the temperature of the reformer detected by the temperature detector is equal to or lower than a predetermined temperature, after the third controller executes the control process, and the second controller may execute the control process in which the fuel injection valve and the first throttle valve are closed and the second throttle valve is closed, after the first controller executes the control process.

In this configuration, almost only air flows through the reformer passage to purge the inside of the reformer passage, which can reduce the amount of fuel that passes through the reformer. In addition, the amount of fuel and air to be supplied to the reformer is reduced before purging of the inside of the reformer passage, and thereby the temperature of the catalyst in the reformer decreases. This can prevent oxidative deterioration of the catalyst.

The second controller may control the fuel injection valve and the first throttle valve so as to be closed and may control the second throttle valve so as to be closed, after a lapse of a predetermined time from execution of the control process by the first controller.

In this configuration, the engine can be stopped in a state where gas in the reformer passage is replaced with air (fresh air).

The second controller may execute the control process in which the fuel injection valve and the fuel supply valve are closed, after the stop instruction member gives the instruction of the stop of the engine. The first controller may execute the control process in which the fuel supply valve is closed and the first throttle valve and the second throttle valve are opened, after the second controller executes the control process.

In this configuration, the supply of fuel to the engine is stopped after the instruction of the stop of the engine. This allows the engine to be stopped after several rotations by inertia. At this time, since air is supplied to the engine and the reformer, the inside of the reformer passage is purged by air (fresh air). In this case, an engine speed at a stop of the engine is stabilized, and also condensation of steam remaining in the reformer passage is prevented.

The engine system further includes a motor configured to start the engine, wherein the first controller may execute the control process in which the first throttle valve and the second throttle valve are opened and the motor is controlled such that the engine is cranked by a predetermined number of rotations, after the second controller executes the control process.

In this configuration, air is supplied to the engine and the reformer, and the engine is cranked by the predetermined number of rotations, so that the inside of the reformer passage is stably purged by air.

The engine system further includes a temperature detector configured to detect a temperature of the reformer, wherein the control unit includes a third controller configured to execute a control process in which the fuel supply valve and the second throttle valve are controlled such that amounts of fuel and air to be supplied to the reformer are reduced, when the stop instruction member gives the instruction of the stop of the engine, before each of the second controller and the first controller executes the corresponding control process, and the second controller may execute the control process in which the fuel injection valve and the fuel supply valve are closed when the temperature of the reformer detected by the temperature detector is equal to or lower than a predetermined temperature, after the third controller executes the control process.

In this configuration, the amounts of fuel and air to be supplied to the reformer are reduced before purging of the inside of the reformer passage, so that the temperature of the catalyst in the reformer decreases. This can prevent oxidative deterioration of the catalyst.

The first controller may execute the control process in which the first throttle valve and the second throttle valve are closed and the fuel supply valve is opened, after the stop instruction member gives the instruction of the stop of the engine. The second controller may execute the control process in which the fuel injection valve and the fuel supply valve are closed, after the first controller executes the control process.

In this configuration, supply of air to the engine and the reformer is stopped after the instruction of the stop of the engine. Therefore, the inside of the reformer passage is purged by fuel. After that, supply of fuel to the engine and the reformer is stopped. Thus, the engine stops. Since the engine is stopped after purging of the inside of the reformer passage in this manner, condensation of steam remaining in the reformer passage is prevented without discomfort of a driver in a vehicle.

The engine system further includes a stop valve configured to open and close the reformed gas flow passage, wherein the second controller may execute the control process in which the fuel injection valve and the fuel supply valve are closed, the stop valve is then closed, and the first throttle valve is also opened.

In this configuration, air is supplied to the engine after completion of purging in the reformer passage by fuel. Therefore, the fuel existing between the stop valve and the engine is purged by air, due to residual rotations when the engine stops. This can prevent disagreeable odor, etc. caused by the fuel, in the intake passage and the reformed gas flow passage.

The engine system further includes a temperature detector configured to detect a temperature of the reformer, wherein the control unit includes a third controller configured to execute a control process in which the fuel supply valve and the second throttle valve are controlled such that amounts of fuel and air to be supplied to the reformer are reduced, when the stop instruction member gives the instruction of the stop of the engine, before each of the first controller and the second controller executes the corresponding control process, and the first controller may execute the control process in which the first throttle valve and the second throttle valve are closed and the fuel supply valve is opened when the temperature of the reformer detected by the temperature detector is equal to or lower than a predetermined temperature, after the third controller executes the control process.

In this configuration, the amounts of fuel and air to be supplied to the reformer are reduced before purging of the inside of the reformer passage, so that the temperature of the catalyst in the reformer decreases. This can prevent oxidative deterioration of the catalyst.

The engine may be an ammonia engine using ammonia as the fuel. Ammonia is more easily combusted when ammonia is mixed with hydrogen in the engine. Therefore, it is effective that an engine system of the present invention is applied to the ammonia engine.

Advantageous Effects of Invention

According to the present invention, condensation of steam remaining in the reformer passage when the engine stops can be prevented.

DESCRIPTION OF EMBODIMENTS

Figure 1:
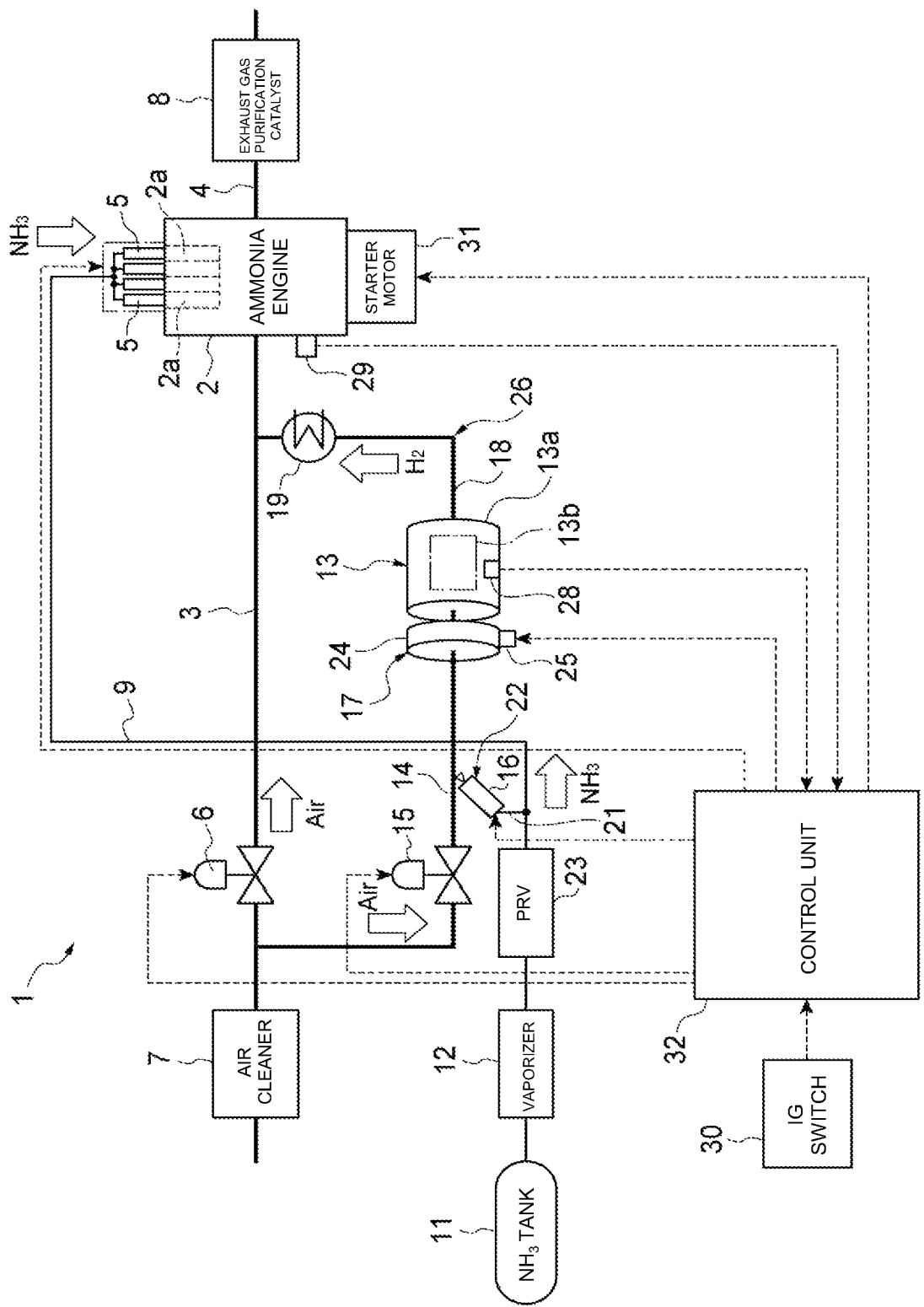
FIG. 1 is a schematic configuration view, illustrating an engine system according to a first embodiment of the present invention.

Hereinafter, embodiments of the present invention will be described in detail with reference to the accompanying drawings. In the drawings, the same or equivalent parts are designated by the same reference numerals, and the redundant descriptions thereof are omitted.

FIG. 1 is a schematic configuration view, illustrating an engine system according to a first embodiment of the present invention. In FIG. 1, an engine system 1 of the present embodiment is mounted on a vehicle. The engine system 1 includes an ammonia engine 2, an intake passage 3, an exhaust passage 4, a plurality of (four in the present embodiment) main injectors 5, and a main throttle valve 6.

The ammonia engine 2 is an engine that uses ammonia ($NH_3$) as a fuel. The ammonia engine 2 is, for example, a four-cylinder engine with four combustion chambers 2a. Hydrogen ($H_2$) with ammonia is supplied to each of the combustion chambers 2a. Accordingly, ammonia is mixed with hydrogen in each of the combustion chambers 2a, which more easily combusts ammonia.

The intake passage 3 is connected to the combustion chambers 2a. The intake passage 3 is a passage through which air to be supplied to the combustion chambers 2a in the ammonia engine 2 flows. An air cleaner 7, which removes foreign matters such as dust contained in air, is disposed in the intake passage 3.

The exhaust passage 4 is connected to the combustion chambers 2a. The exhaust passage 4 is a passage through which exhaust gas generated from each of the combustion chambers 2a flows. An exhaust gas purification catalyst 8, which removes hazardous materials such as nitrogen oxides (NOx) and ammonia contained in the exhaust gas, is disposed in the exhaust passage 4. For example, a three-way catalyst, or a SCR (Selective Catalytic Reduction) catalyst, which will be described later, is used as the exhaust gas purification catalyst 8.

Each of the main injectors 5 is an electromagnetic fuel injection valve, which is configured to inject ammonia gas ($NH_3$ gas) into the corresponding combustion chamber 2a in the ammonia engine 2. The main injectors 5 are connected to a vaporizer 12, which will be described later, through an ammonia gas flow passage 9. The ammonia gas flow passage 9 is a passage through which ammonia gas flows. The main injectors 5 are mounted to the ammonia engine 2.

The main throttle valve 6 is disposed in the intake passage 3, specifically between the air cleaner 7 and the ammonia engine 2. The main throttle valve 6 corresponds to a first throttle valve, which is configured to control the flow rate of air to be supplied to the ammonia engine 2. An electromagnetic flow control valve is used as the main throttle valve 6.

The engine system 1 includes an ammonia tank 11, the vaporizer 12, a reforming device 13, an air flow passage 14, a reforming throttle valve 15, a reforming injector 16, an electric heater 17, a reformed gas flow passage 18, and a reformed gas cooler 19.

The ammonia tank 11 stores ammonia in a liquid state. That is, the ammonia tank 11 stores liquid ammonia. The vaporizer 12 vaporizes liquid ammonia stored in the ammonia tank 11 to generate ammonia gas.

The reforming device 13 has a reforming catalyst 13b for cracking ammonia gas into hydrogen, and corresponds to a reformer that reforms ammonia gas to generate reformed gas containing hydrogen. The reforming device 13 includes a carrier 13a having, for example, a honeycomb structure. The carrier 13a is coated with the reforming catalyst 13b for cracking ammonia gas into hydrogen. The reforming catalyst 13b has the function that combusts ammonia gas, in addition to the function that cracks ammonia gas into hydrogen. The reforming catalyst 13b is an ATR (Autothermal Reforming) ammonia reforming catalyst. A low temperature reaction catalyst may be adopted as the reforming catalyst 13b.

The air flow passage 14 connects the intake passage 3 with the reforming device 13. Specifically, the air flow passage 14, which branches off from the intake passage 3, has one end connected to a portion between the air cleaner 7 and the main throttle valve 6 in the intake passage 3. The other end of the air flow passage 14 is connected to the reforming device 13. The air flow passage 14 is a passage through which air to be supplied to the reforming device 13 flows.

The reforming throttle valve 15 is disposed in the air flow passage 14. The reforming throttle valve 15 corresponds to a second throttle valve, which controls the flow rate of air to be supplied to the reforming device 13. An electromagnetic flow control valve is used as the reforming throttle valve 15.

The reforming injector 16 is connected to the vaporizer 12 through an ammonia gas flow passage 21. The ammonia gas flow passage 21 is a passage through which ammonia gas generated by the vaporizer 12 flows. The reforming injector 16 is an electromagnetic fuel injection valve, which is configured to inject ammonia gas toward the reforming device 13. Specifically, the reforming injector 16 injects ammonia gas into a part of the air flow passage 14, specifically between the reforming throttle valve 15 and the reforming device 13. Therefore, air and ammonia gas flow through a part of the air flow passage 14, between the reforming throttle valve 15 and the reforming device 13. That is, the reforming injector 16 corresponds to a fuel supply valve for supplying ammonia gas, which is a fuel, to the reforming device 13.

A pressure reducing valve 23 is disposed in the ammonia gas flow passage 21. The pressure reducing valve 23 depressurizes ammonia gas to be supplied to the ammonia engine 2 and the reforming device 13. The pressure reducing valve 23 keeps the pressure of ammonia gas to be supplied to the ammonia engine 2 and the reforming device 13, at a predetermined pressure.

The electric heater 17 is a heating member that heats ammonia gas to be supplied to the reforming device 13 to increase the temperature of the reforming device 13 with ammonia gas. The electric heater 17 has a heating element 24 disposed in the air flow passage 14 and a power supply 25 which energizes the heating element 24. The heating element 24 has, for example, a honeycomb structure. The heat of ammonia gas heated by the electric heater 17 is transferred to the reforming device 13, which increases the temperature of the reforming device 13.

The reformed gas flow passage 18 connects the reforming device 13 with the intake passage 3. Specifically, one end of the reformed gas flow passage 18 is connected to the reforming device 13. The reformed gas flow passage 18, which branches off from the intake passage 3, has the other end connected to a portion between the main throttle valve 6 and the ammonia engine 2 in the intake passage 3. The reformed gas flow passage 18 is a passage through which reformed gas generated by the reforming device 13 flows toward the ammonia engine 2. The reforming device 13 and the reformed gas flow passage 18 constitute a reformer passage 26.

The reformed gas cooler 19 is disposed in the reformed gas flow passage 18. The reformed gas cooler 19 cools reformed gas to be supplied to the ammonia engine 2. The reformed gas cooler 19 prevents damage of intake system components such as the main throttle valve 6 by heat, and also allows expansion of the volume of reformed gas to be suppressed. Therefore, a sufficient amount of air is easily sucked into the combustion chambers 2a of the ammonia engine 2.

The engine system 1 includes a temperature sensor 28, an engine speed sensor 29, an ignition switch 30 (IG switch), a starter motor 31, and a control unit 32.

The temperature sensor 28 corresponds to a temperature detector that detects a temperature of the reforming device 13. The temperature sensor 28 detects, for example, the temperature at an upstream end of the reforming catalyst 13b of the reforming device 13. The engine speed sensor 29 corresponds to an engine speed detector that detects the speed of the ammonia engine 2.

The ignition switch 30 is a manually-operated switch for a driver in a vehicle to give instructions of a start and a stop of the ammonia engine 2. The ignition switch 30 is included in a stop instruction member configured to give an instruction of a stop of the ammonia engine 2. The starter motor 31 is a motor that starts the ammonia engine 2.

The control unit 32 is composed of a CPU, a RAM, a ROM, an input-output interface, and the like. The control unit 32 controls the main injectors 5, the main throttle valve 6, the reforming throttle valve 15, the reforming injector 16, the power supply 25 of the electric heater 17, and the starter motor 31, based on an operation signal of the ignition switch 30 and detected values of the temperature sensor 28 and the engine speed sensor 29.

Figure 2:
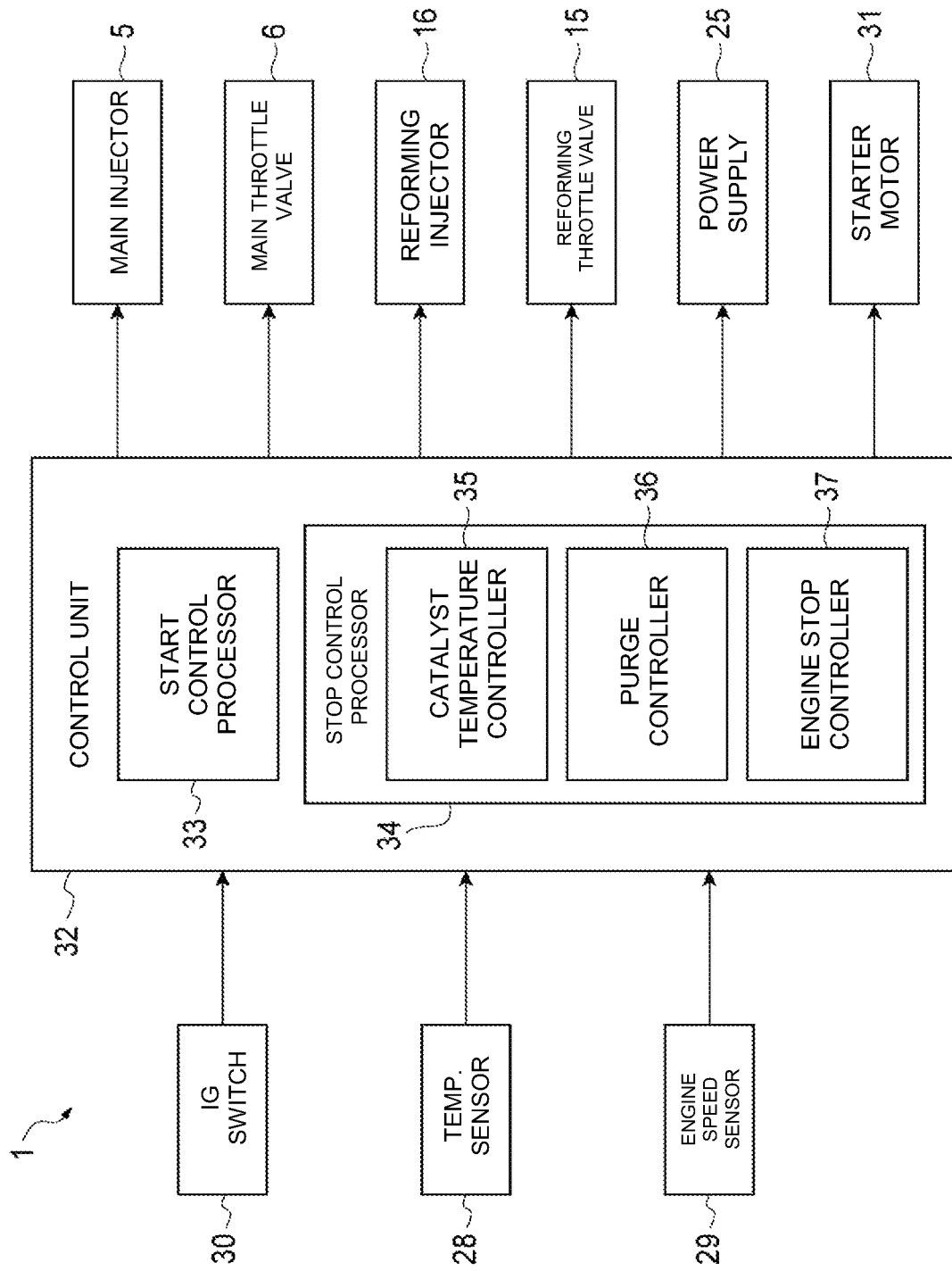
FIG. 2 is a block diagram, illustrating a configuration of a control system of the engine system illustrated in FIG. 1.

As illustrated in FIG. 2, the control unit 32 includes a start control processor 33 that executes a control process when the ammonia engine 2 starts, and a stop control processor 34 that executes a control process when the ammonia engine 2 stops.

Figure 3:
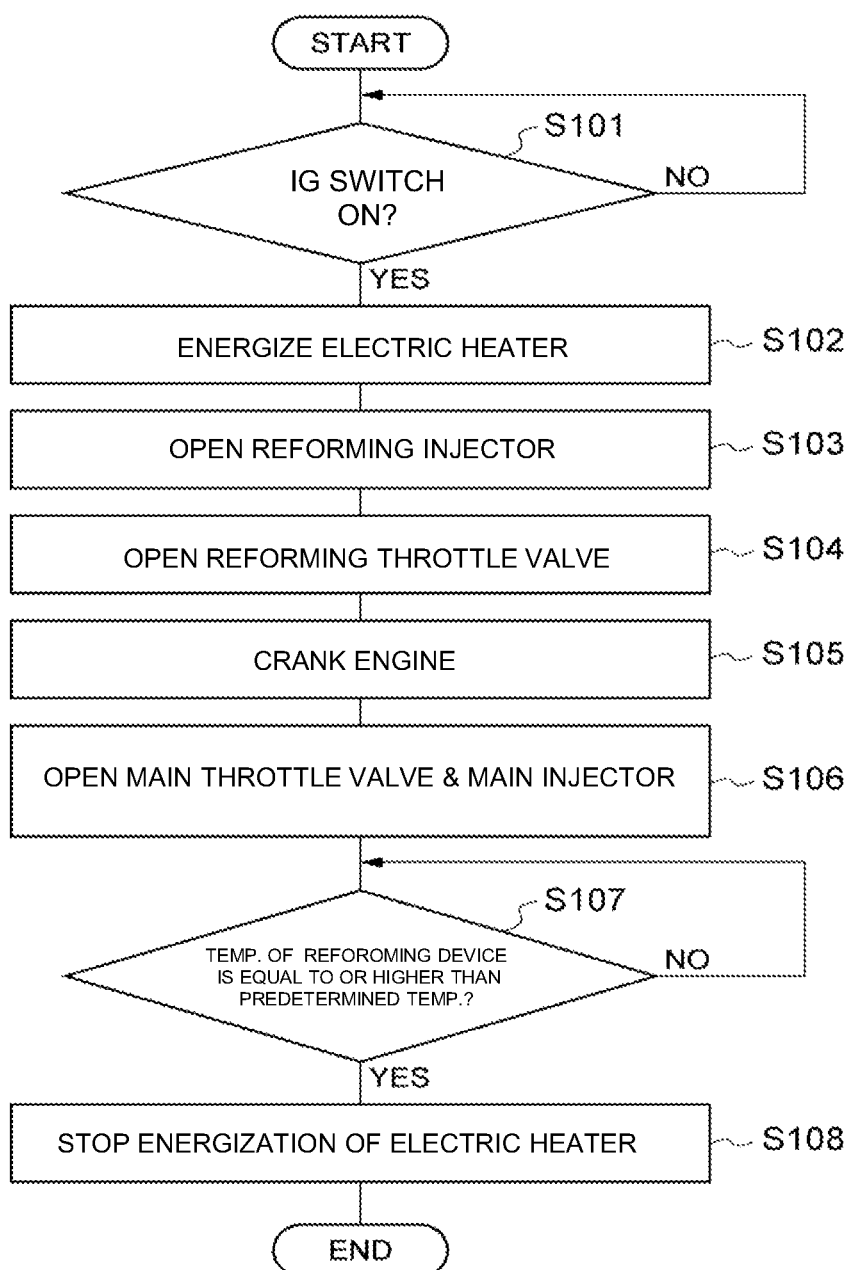
FIG. 3 is a flowchart, illustrating details of steps of a start control process executed by a start control processor illustrated in FIG. 2.

FIG. 3 is a flowchart, illustrating details of steps of a start control process executed by the start control processor 33. Before execution of the control process, the main injectors 5, the main throttle valve 6, the reforming throttle valve 15, and the reforming injector 16 are in a fully-closed state.

In FIG. 3, the start control processor 33 determines whether the ignition switch 30 is turned ON based on the operation signal from the ignition switch 30 (Step S101). When the start control processor 33 determines that the ignition switch 30 is not turned ON (Step S101: NO), the start control processor 33 executes the Step S101 again. When the start control processor 33 determines that the ignition switch 30 is turned ON (Step S101: YES), the start control processor 33 controls the power supply 25 so as to energize the heating element 24 of the electric heater 17 (Step S102). This allows the heating element 24 to generate heat.

The start control processor 33 controls the reforming injector 16 so as to be opened (Step S103). Then, ammonia gas is injected from the reforming injector 16 and supplied to the reforming device 13. At this time, since ammonia gas is heated by the heating element 24, heat of ammonia gas increases the temperature of the reforming device 13. Then, the start control processor 33 controls the reforming throttle valve 15 so as to be opened (Step S104). This allows air to be supplied to the reforming device 13.

The start control processor 33 controls the starter motor 31 such that the ammonia engine 2 is cranked (Step S105). Thus, the ammonia engine 2 starts.

Subsequently, the start control processor 33 controls the main throttle valve 6 so as to be opened and controls the main injectors 5 so as to be opened (Step S106). Thus, the ammonia engine 2 is supplied with air and ammonia gas injected from the main injector 5.

Then, the start control processor 33 determines whether the temperature of the reforming device 13 is equal to or higher than a predetermined temperature, based on a detected value of the temperature sensor 28 (Step S107). When the start control processor 33 determines that the temperature of the reforming device 13 is lower than the predetermined temperature (Step S107: NO), the start control processor 33 executes the Step S107 again. The predetermined temperature is a temperature at which ammonia gas can be combusted, for example, about 200° C. When the start control processor 33 determines that the temperature of the reforming device 13 is equal to or higher than the predetermined temperature (Step S107: YES), the start control processor 33 controls the power supply 25 such that energization of the heating element 24 is stopped (Step S108).

The steps of the control process executed by the start control processor 33 are not limited to the above-described flow. For example, the Step S105 may be executed after the Step S107.

As illustrated in FIG. 2, the stop control processor 34 includes a catalyst temperature controller 35, a purge controller 36, and an engine stop controller 37.

When the ignition switch 30 gives the instruction of the stop of the ammonia engine 2, the catalyst temperature controller 35 executes a control process in which the reforming injector 16 and the reforming throttle valve 15 are controlled such that amounts of ammonia gas and air to be supplied to the reforming device 13 are reduced. Thereby, the catalyst temperature controller 35 controls the temperature of the reforming catalyst 13b of the reforming device 13 so as to decrease.

After the catalyst temperature controller 35 executes the above-described control process, when the temperature of the reforming device 13 detected by the temperature sensor 28 is equal to or lower than a predetermined temperature (which will be described later), the purge controller 36 executes a control process in which the reforming injector 16 is closed and the reforming throttle valve is opened. Thereby, the purge controller 36 controls the inside of the reformer passage 26 so as to be purged (purified).

After the purge controller 36 executes the above-described control process, the engine stop controller 37 controls the main injectors 5 and the main throttle valve 6 so as to be closed and also controls the reforming throttle valve 15 so as to be closed, which controls the ammonia engine 2 so as to be stopped.

The purge controller 36 is included in a first controller configured to control the reforming injector 16 so as to be closed and also control the reforming throttle valve 15 so as to be opened, after the ignition switch 30 gives the instruction of the stop the ammonia engine 2.

The engine stop controller 37 is included in a second controller configured to control the main injectors 5 so as to be closed, after the ignition switch 30 gives the instruction of the stop of the ammonia engine 2.

The catalyst temperature controller 35 is included in a third controller configured to control the reforming injector 16 and the reforming throttle valve 15 such that the amounts of ammonia gas and air to be supplied to the reforming device 13 are reduced, when the ignition switch 30 gives the instruction of the stop of the ammonia engine 2, before each of the purge controller 36 and the engine stop controller 37 executes the corresponding control process.

Figure 4:
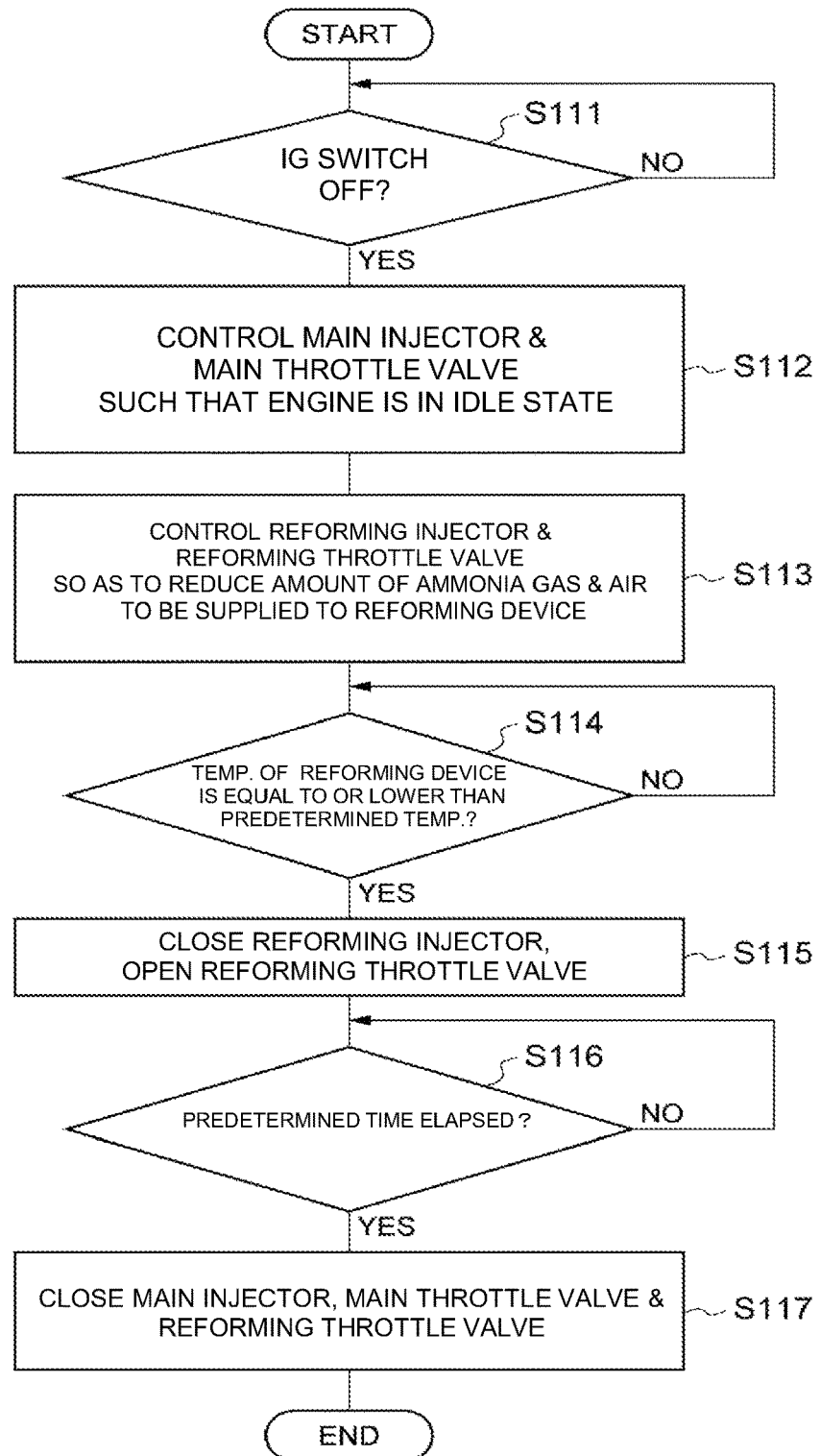
FIG. 4 is a flowchart, illustrating details of steps of stop control processes executed by a stop control processor illustrated in FIG. 2.

FIG. 4 is a flowchart, illustrating details of steps of stop control processes executed by the stop control processor 34. Before execution of the control processes, the main injectors 5, the main throttle valve 6, the reforming throttle valve 15, and the reforming injector 16 are in an opened state.

In FIG. 4, the stop control processor 34 determines whether the ignition switch 30 is turned OFF, based on an operation signal from the ignition switch 30 (Step S111).

When the stop control processor 34 determines that the ignition switch 30 is not turned OFF (Step S111: NO), the stop control processor 34 executes the Step S111 again. When the stop control processor 34 determines that the ignition switch 30 is turned OFF (Step S111: YES), the stop control processor 34 controls opening degrees of the main injectors 5 and the main throttle valve 6 such that the ammonia engine 2 is in an idle state (Step S112). Specifically, the stop control processor 34 controls the opening degrees of the main injectors 5 and the main throttle valve 6 such that the amounts of ammonia gas and air to be supplied to the ammonia engine 2 correspond to those of the ammonia engine 2 in the idle state.

The stop control processor 34 controls the opening degrees of the reforming injector 16 and the reforming throttle valve 15 such that the amounts of ammonia gas and air to be supplied to the reforming device 13 are reduced (Step S113). This leads to a decrease in the temperature of the reforming catalyst 13b of the reforming device 13. At this time, the amounts of ammonia gas and air to be supplied to the reforming device 13 are set to be a state where ammonia gas is rich with respect to air. This can keep the reforming device 13 in a reducing atmosphere.

Then, the stop control processor 34 determines whether the temperature of the reforming device 13 is equal to or lower than the predetermined temperature (Step S114). The predetermined temperature is a temperature at which oxidative deterioration of the reforming catalyst 13b does not progress, for example, about 200° C.

When the stop control processor 34 determines that the temperature of the reforming device 13 is higher than the predetermined temperature (Step S114: NO), the stop control processor 34 executes the Step S114 again. After the stop control processor 34 executes the control process in the Steps S111 to S113, when the stop control processor 34 determines that the temperature of the reforming device 13 detected by the temperature sensor 28 is equal to or lower than the predetermined temperature (Step S114: YES), the stop control processor 34 controls the reforming injector 16 so as to be closed and also controls the reforming throttle valve so as to be opened (Step S115). At this time, the stop control processor 34 fully closes the reforming injector 16, for example. Accordingly, injection of ammonia gas from the reforming injector 16 is stopped, and therefore ammonia gas is not supplied to the reforming device 13.

Then, the stop control processor 34 determines whether the predetermined time has elapsed after controlling the reforming injector 16 so as to be closed (Step S116). For example, the predetermined time is set for a time during which all gas in the reformer passage 26 is replaced with air (fresh air). The predetermined time may be calculated from the engine speed of the ammonia engine 2 in the idle state (idle speed), the displacement of the ammonia engine 2, the volume of the reformer passage 26, and the like. The idle speed may be adjusted and determined in advance, or may be detected by the engine speed sensor 29.

When the stop control processor 34 determines that the predetermined time has not elapsed (Step S116: NO), the stop control processor 34 executes the Step S116 again. After the stop control processor 34 executes the control process in the Steps S114 and S115, when the stop control processor 34 determines that the predetermined time has elapsed (Step S116: YES), the stop control processor 34 controls the main injectors 5, the main throttle valve 6, and the reforming throttle valve 15 so as to be closed (Step S117). At this time, the stop control processor 34 controls, for example, the main injectors 5, the main throttle valve 6, and the reforming throttle valve 15 so as to be fully closed. Thus, the ammonia engine 2 stops.

Here, the catalyst temperature controller 35 executes the Steps S111 to S113. The purge controller 36 executes the Steps S114 and S115. The engine stop controller 37 executes the Steps S116 and S117.

In the above-described engine system 1, when the ignition switch 30 is turned ON, the heating element 24 of the electric heater 17 is energized to generate heat. Then, the reforming injector 16 is opened, so that the reforming injector 16 injects ammonia gas to be supplied to the reforming device 13. At this time, ammonia gas is heated by heat of the heating element 24. Heat of ammonia gas is transmitted to the reforming device 13, so that the temperature of the reforming device 13 increases. The reforming throttle valve 15 is then opened, so that air is supplied to the reforming device 13.

Then, the starter motor 31 starts the ammonia engine 2. The main throttle valve 6 and the main injectors 5 are opened to supply air to the combustion chambers 2a of the ammonia engine 2, and also supply ammonia gas injected by the main injectors 5 to the combustion chambers 2a of the ammonia engine 2. Accordingly, ammonia gas starts to be combusted in the combustion chambers 2a.

Energization of the heating element 24 is stopped when the temperature of the reforming device 13 reaches a predetermined temperature. However, the temperature of the reforming device 13 further increases due to heat of combustion of ammonia gas that is ignited by the reforming catalyst 13b of the reforming device 13. Specifically, as shown in the following chemical formula, a chemical reaction (oxidation reaction) occurs between a part of ammonia and oxygen in the air. As a result, a combustion reaction of ammonia occurs to generate combustion heat.

$$NH_3 + \tfrac{3}{4}O_2 \rightarrow \tfrac{1}{2}N_2 + \tfrac{3}{2}H_2O + Q$$

When the temperature of the reforming device 13 reaches the temperature at which ammonia gas can be reformed (for example, about 300° C. to 400° C.), reforming of ammonia gas is started by the reforming catalyst 13b of the reforming device 13, thereby generating reformed gas containing hydrogen. Specifically, as shown in the following chemical formula, occurrence of a reforming reaction in which ammonia is cracked into hydrogen and nitrogen by combustion heat of ammonia, generates reforming gas containing hydrogen and nitrogen. The reformed gas is supplied to the combustion chambers 2a of the ammonia engine 2 through the reformed gas flow passage 18.

$$NH_3 \rightarrow \tfrac{3}{2}H_2 + \tfrac{1}{2}N_2 - Q$$

Thus, in the combustion chambers 2a, ammonia gas is combusted together with hydrogen contained in the reformed gas. Accordingly, a normal operation after completion of warming up of the reforming device 13 is performed in the engine system 1.

When the ignition switch 30 is turned OFF in the normal operation, the ammonia engine 2 is in the idle state, which further reduces the amounts of ammonia gas and air to be supplied to the reforming device 13. This leads to a decrease in the temperature of the reforming catalyst 13b of the reforming device 13.

When the temperature of the reforming device 13 decreases to a predetermined temperature, the reforming injector 16 is closed, so that injection of ammonia gas from the reforming injector 16 is stopped. As a result, ammonia gas is not supplied to the reforming device 13. Therefore, since only air is supplied to the reforming device 13, the inside of the reformer passage 26 is purged (scavenged) by air.

After a lapse of a predetermined time, the reforming throttle valve 15 is closed, so that supply of air to the reforming device 13 is stopped. In addition, the main injectors 5 and the main throttle valve 6 are closed, so that supply of air to the combustion chambers 2a of the ammonia engine 2, injection of ammonia gas from the main injectors 5, and supply of ammonia gas to the combustion chambers 2a of the ammonia engine 2 are stopped. As a result, the ammonia engine 2 stops after several rotations by inertia.

As described above, in the present embodiment, after the instruction of the stop of the ammonia engine 2, the reforming injector 16 is controlled so as to be closed and also the reforming throttle valve 15 is controlled so as to be opened, so that almost only air flows through the inside of the reformer passage 26 including the reforming device 13 and the reformed gas flow passage 18. Therefore, the inside of the reformer passage 26 is purged by air. In addition, the main injectors 5 are controlled so as to be closed, after the instruction of the stop of the ammonia engine 2. Accordingly, supply of ammonia gas to the ammonia engine 2 is stopped, so that the ammonia engine 2 is stopped. As such, at a stop of the ammonia engine 2, steam ($H_2O$) does not exist in the reformer passage 26 because the inside of the reformer passage 26 is purged. This can prevent condensation of steam remaining in the reformer passage 26.

This results in elimination of problems such as deterioration in the function of the reforming catalyst 13b due to water submersion of the reforming catalyst 13b of the reforming device 13, blockage of the reformer passage 26 due to freezing of water below the freezing point, alkali corrosion due to generation of strong alkaline ammonia water by dissolution of ammonia gas into water in the reformer passage 26, strong acid corrosion due to generation of $HNO_3$ by dissolution of NOx into water in the reformer passage 26.

Furthermore, when the reforming catalyst 13b is wet with water after a stop of the ammonia engine 2, such condition causes deterioration of reaction activity of the reforming catalyst 13b at a next start of the ammonia engine 2. This causes a longer start time of the ammonia engine 2. In the present embodiment, since the condition in which the reforming catalyst 13b is wet with water is prevented, deterioration of reaction activity of the reforming catalyst 13b can be suppressed at a next start of the ammonia engine 2. Therefore, a start time of the ammonia engine 2 is shortened.

In the present embodiment, supply of ammonia gas to the reforming device 13 is stopped after the instruction of the stop of the ammonia engine 2. Therefore, the inside of the reformer passage 26 is purged by air. After that, supply of ammonia gas and air to the ammonia engine 2 is stopped, and also supply of air to the reforming device 13 is stopped. Thus, the ammonia engine 2 stops. Since the ammonia engine 2 is stopped after purging of the inside of the reformer passage 26 in this manner, condensation of steam remaining in the reformer passage 26 can be prevented without discomfort of a driver in a vehicle.

In the present embodiment, the inside of the reformer passage 26 is purged by almost only air that passes through the inside of the reformer passage 26, which reduces the amount of ammonia gas that passes through the reforming device 13. As a result, a device which executes post-treatment of ammonia gas can be downsized. In addition, the amounts of ammonia gas and air to be supplied to the reforming device 13 are reduced before purging of the inside of the reformer passage 26, so that the temperature of the reforming catalyst 13b in the reforming device 13 decreases. This can prevent oxidative deterioration of the reforming catalyst 13b.

In the present embodiment, after a lapse of the predetermined time from a stop of ammonia gas to be supplied to the reforming device 13, supply of ammonia gas and air to the ammonia engine 2 is stopped, and also supply of air to the reforming device 13 is stopped. Therefore, the ammonia engine 2 can be stopped in a state where gas in the reformer passage 26 is replaced with air (fresh air).

In the present embodiment, in the Step S115, the stop control processor 34 controls the reforming injector 16 so as to be in a fully-closed state. However, the opening degree of the reforming injector 16 need not be fully closed. The stop control processor 34 may control the reforming injector 16 so as to be closed with the opening degree that allows a small amount of ammonia gas to flow, to the extent that steam ($H_2O$) is not generated in the reformer passage 26.

Also in the Step S117, the opening degrees need not be fully closed as long as the stop control processor 34 controls the main injectors 5, the main throttle valve 6, and the reforming throttle valve 15 so as to be closed.

In the present embodiment, the purge controller 36 controls the reforming injector 16 so as to be closed and also controls the reforming throttle valve 15 so as to be opened, so that the inside of the reformer passage 26 is purged, but other control processes are acceptable. The purge controller 36 may control the reforming throttle valve 15 so as to be closed and also control the reforming injector 16 so as to be opened, so that the inside of the reformer passage 26 is purged. In this case, the inside of the reformer passage 26 is purged by almost only ammonia gas because supply of air to the reforming device 13 is stopped.

Figure 5:
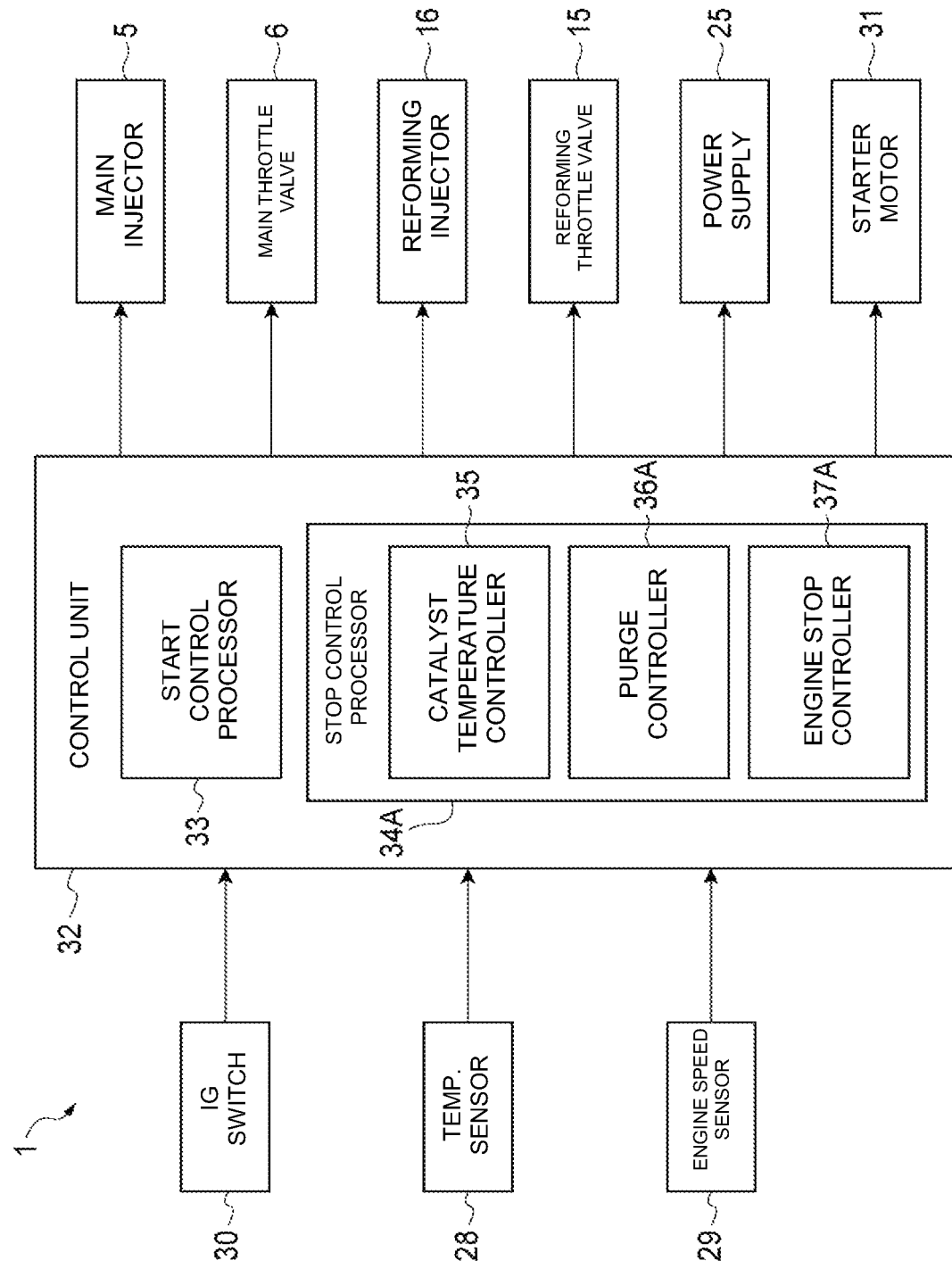
FIG. 5 is a block diagram, illustrating a configuration of a control system of an engine system according to a second embodiment of the present invention.

FIG. 5 is a block diagram, illustrating a configuration of a control system of an engine system according to a second embodiment of the present invention. In FIG. 5, the control unit 32 of the engine system 1 of the present embodiment includes a stop control processor 34A, instead of the stop control processor 34 of the above-described first embodiment. The stop control processor 34A includes the above-described catalyst temperature controller 35, a purge controller 36A, and an engine stop controller 37A.

The engine stop controller 37A executes a control process in which the main injectors 5 and the reforming injector 16 are closed when the temperature of the reforming device 13 detected by the temperature sensor 28 is equal to or lower than a predetermined temperature, after the ignition switch 30 gives the instruction of the stop of the ammonia engine 2 and after the catalyst temperature controller 35 executes the control process.

After the engine stop controller 37A executes the above-described control process, the purge controller 36A controls the reforming injector 16 so as to be closed and also controls the main throttle valve 6 and the reforming throttle valve 15 so as to be opened. In addition, the purge controller 36A controls the main throttle valve 6 and the reforming throttle valve 15 so as to be opened, and controls the starter motor 31 such that the ammonia engine 2 is cranked by the predetermined number of rotations.

Figure 6:
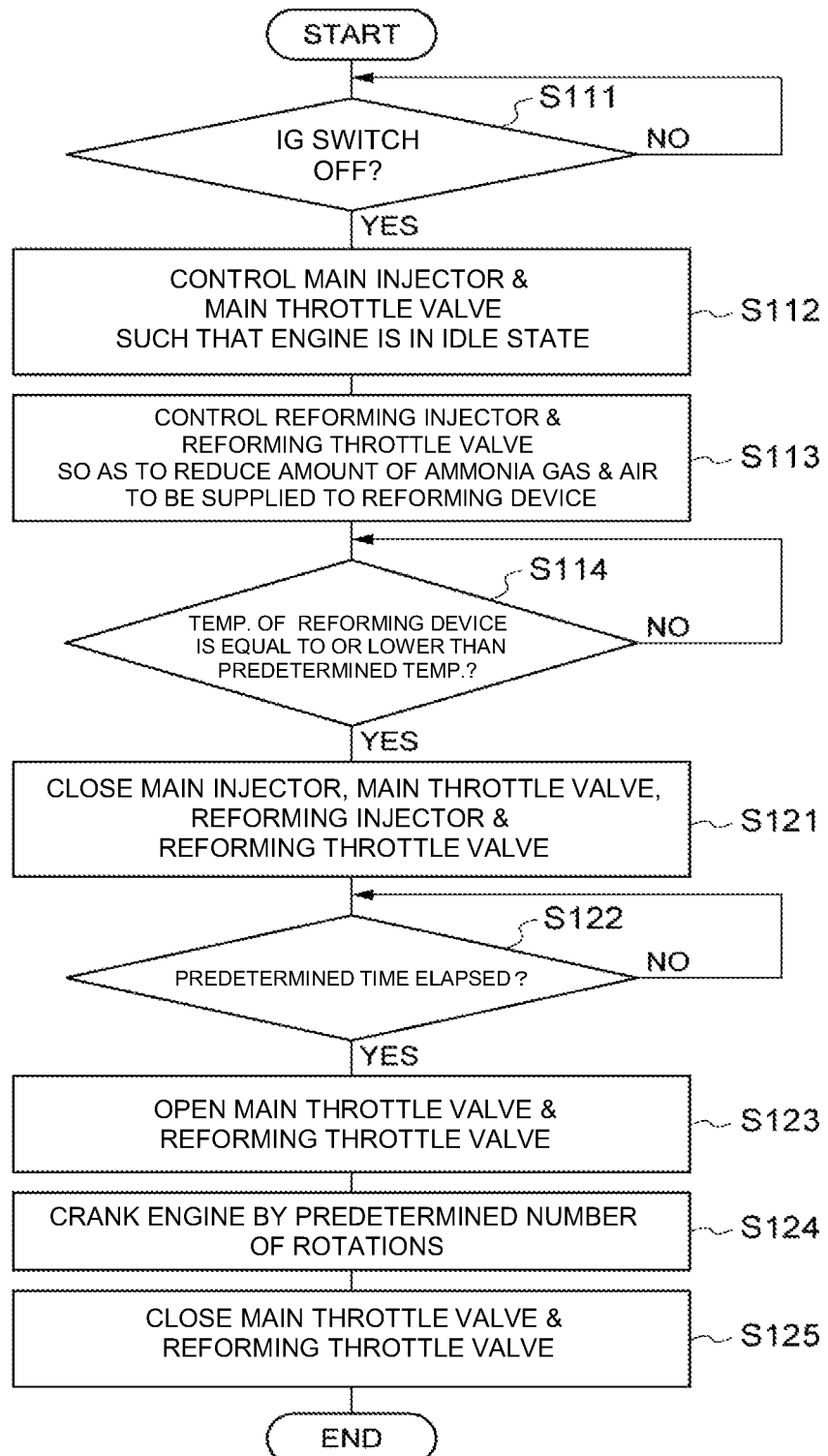
FIG. 6 is a flowchart, illustrating details of steps of stop control processes executed by a stop control processor illustrated in FIG. 5.

FIG. 6 is a flowchart, illustrating details of steps of control processes executed by the stop control processor 34A. Before execution of the control process, the main injectors 5, the main throttle valve 6, the reforming throttle valve 15, and the reforming injector 16 are in an opened state.

In FIG. 6, the stop control processor 34A sequentially executes the Steps S111 to S114, similarly to the stop control processor 34 in the above-described first embodiment. After the stop control processor 34A executes the control process in the Steps S111 to S113, when the stop control processor 34A determines that the temperature of the reforming device 13 detected by the temperature sensor 28 in the Step S114 is equal to or lower than a predetermined temperature (Step S114: YES), the stop control processor 34A controls the main injectors 5, the main throttle valve 6, the reforming injector 16 and the reforming throttle valve 15 so as to be closed (Step S121). At this time, the stop control processor 34A controls, for example, the main injectors 5, the main throttle valve 6, the reforming injector 16, and the reforming throttle valve 15 so as to be fully closed. This allows supply of ammonia gas and air to the ammonia engine 2 and the reforming device 13 to be stopped.

Then, the stop control processor 34A determines whether a predetermined time has elapsed after controlling the main injectors 5, the main throttle valve 6, the reforming injector 16, and the reforming throttle valve 15 so as to be closed (Step S122). When the stop control processor 34A determines that the predetermined time has not elapsed (Step S122: NO), the stop control processor 34A executes the Step S122 again. When the stop control processor 34A determines that the predetermined time has elapsed (Step S122: YES), the stop control processor 34A controls the reforming injector 16 so as to be closed (so as to be kept closed) and also controls the main throttle valve 6 and the reforming throttle valve 15 so as to be opened (Step S123). This allows air to be supplied to the ammonia engine 2 and the reforming device 13.

The stop control processor 34A controls the starter motor 31 such that the ammonia engine 2 is cranked by the predetermined number of rotations (Step S124). The predetermined number of rotations, by which gas within the reformer passage 26 can be replaced with air (fresh air), can be calculated from the displacement of the ammonia engine 2, the volume of the reformer passage 26, and the like. For example, when the displacement of the ammonia engine 2 is one liter and the volume of the reformer passage 26 is three liters, the number of rotations is six or more.

Then, the stop control processor 34A controls the main throttle valve 6 and the reforming throttle valve 15 so as to be closed (Step S125). At this time, the stop control processor 34A controls, for example, the main throttle valve 6 and the reforming throttle valve 15 so as to be fully closed. This allows supply of air to the ammonia engine 2 and the reforming device 13 to be stopped.

Here, the engine stop controller 37A executes the Steps S114 and S121. The purge controller 36A executes the Steps S122 to S125.

In the above-described engine system 1, when the ignition switch 30 is turned OFF, the ammonia engine 2 is firstly in the idle state, and the amounts of ammonia gas and air to be supplied to the reforming device 13 are then reduced. This leads to a decrease in the temperature of the reforming catalyst 13b of the reforming device 13.

When the temperature of the reforming device 13 decreases to a predetermined temperature, the main injectors 5, the main throttle valve 6, the reforming injector 16, and the reforming throttle valve 15 are closed, so that ammonia gas and air are not supplied to the combustion chambers 2a of the ammonia engine 2 and the reforming device 13. Therefore, the ammonia engine 2 is rotated by inertia.

The main throttle valve 6 and the reforming throttle valve 15 are opened to supply air to the combustion chambers 2a of the ammonia engine 2 and the reforming device 13. The ammonia engine 2 is cranked by the starter motor 31 by the predetermined number of rotations. Thus, the inside of the reformer passage 26 is purged by air.

As described above, also in the present embodiment, at a stop of the ammonia engine 2, steam does not exist in the reformer passage 26 because the inside of the reformer passage 26 is purged. This can prevent condensation of steam remaining in the reformer passage 26.

In the present embodiment, supply of ammonia gas to the ammonia engine 2 is stopped after the instruction of the stop of the ammonia engine 2. This allows the ammonia engine 2 to be stopped after several rotations by inertia. At this time, since air is supplied to the ammonia engine 2 and the reforming device 13, the inside of the reformer passage 26 is purged by air (fresh air). In this case, an engine speed when the ammonia engine 2 stops is stabilized, and also condensation of steam remaining in the reformer passage 26 is prevented.

In the present embodiment, air is supplied to the ammonia engine 2 and the reforming device 13 and also the ammonia engine 2 is cranked by the predetermined number of rotations, so that the inside of the reformer passage 26 is stably purged by air.

In the present embodiment, when the temperature of the reforming device 13 decreases to a predetermined temperature, the main throttle valve 6 and the reforming throttle valve 15 are temporarily closed, and the main throttle valve 6 and the reforming throttle valve 15 are then opened, but other control processes are acceptable. The main throttle valve 6 and the reforming throttle valve 15 may remain open, even when the temperature of the reforming device 13 decreases to the predetermined temperature.

In the present embodiment, the main throttle valve 6 and the reforming throttle valve 15 are controlled so as to be opened, and also the ammonia engine 2 is cranked by the predetermined number of rotations, but other control processes are acceptable. The ammonia engine 2 need not be cranked as long as the inside of the reformer passage 26 can be purged by inertial rotations of the ammonia engine 2 due to the above-described supply stop of ammonia gas and air to the ammonia engine 2.

In the present embodiment, the stop control processor 34A controls the reforming injector 16 to be fully closed in the Step S121, but the reforming injector 16 need not be fully closed. The stop control processor 34A may control the reforming injector 16 so as to be closed with the opening degree that allows a small amount of ammonia gas to flow, to the extent that steam ($H_2O$) is not generated in the reformer passage 26.

In the Steps S121 and S125, the opening degrees need not be fully closed as long as the stop control processor 34A controls the main injectors 5, the main throttle valve 6, and the reforming throttle valve 15 so as to be closed.

Figure 7:
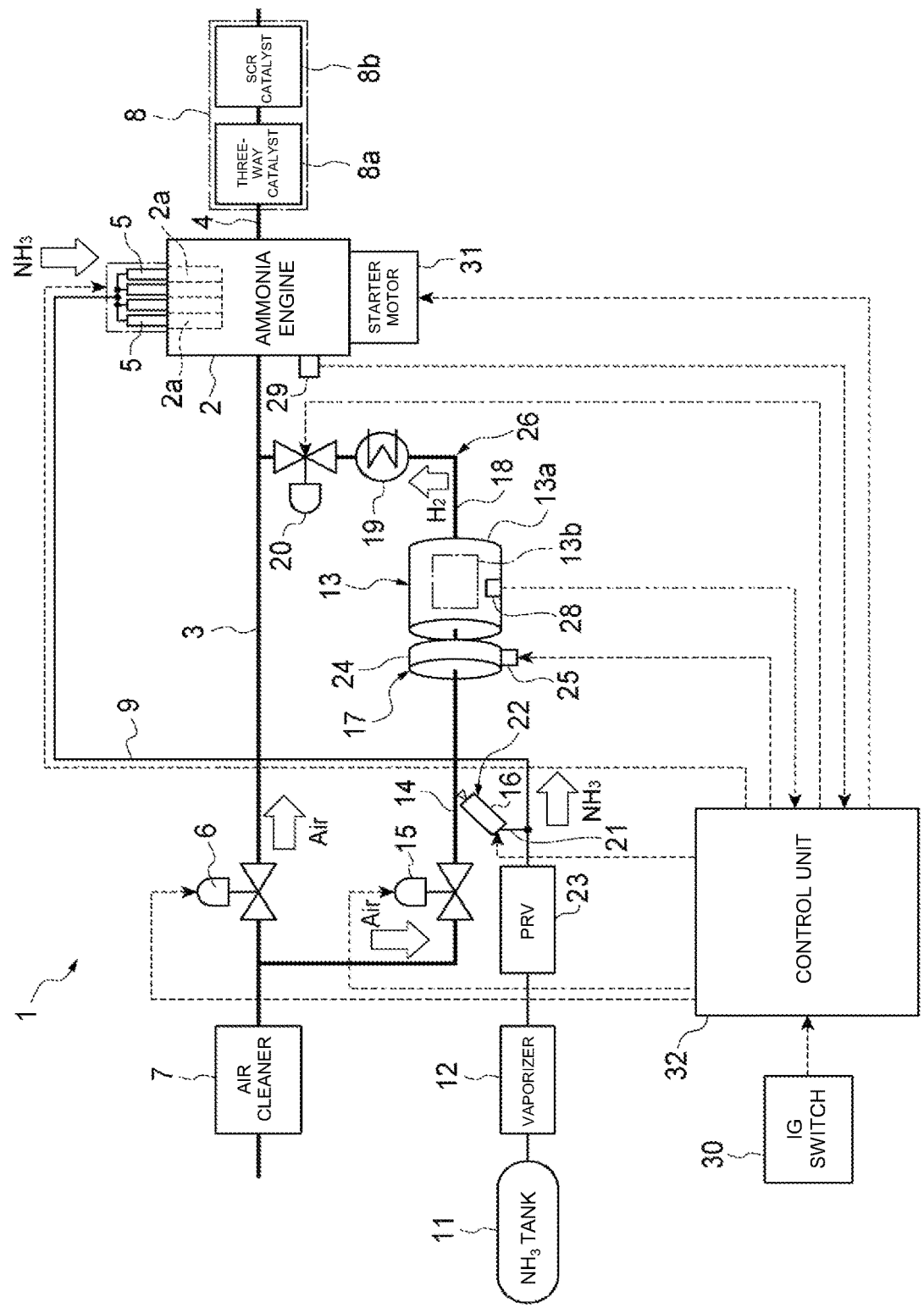
FIG. 7 is a schematic configuration view, illustrating an engine system according to a third embodiment of the present invention.

FIG. 7 is a schematic configuration view, illustrating an engine system according to a third embodiment of the present invention. In FIG. 7, in the engine system 1 of the present embodiment, the exhaust gas purification catalyst 8 has a three-way catalyst 8a and an SCR catalyst 8b.

The three-way catalyst 8a is a catalyst that oxidizes and removes ammonia remaining in the exhaust passage 4. The SCR catalyst 8b is disposed downstream of the three-way catalyst 8a in the exhaust passage 4. The SCR catalyst 8b is a selective reduction catalyst that reduces nitrogen oxides (NOx) contained in exhaust gas to nitrogen ($N_2$) with ammonia. The SCR catalyst 8b is also a catalyst that collects and removes ammonia passing through the three-way catalyst 3a. The SCR catalyst 8b collects ammonia by physically adsorbing ammonia with an adsorbent such as zeolite.

The engine system 1 includes a stop valve 20 disposed in the reformed gas flow passage 18. Specifically, the stop valve 20 is disposed between the reformed gas cooler 19 in the reformed gas flow passage 18 and the intake passage 3. The stop valve 20 is an electromagnetic on-off valve that opens and closes the reformed gas flow passage 18. The stop valve 20 is controlled by the control unit 32. At a start of the ammonia engine 2, the stop valve 20 is opened.

Figure 8:
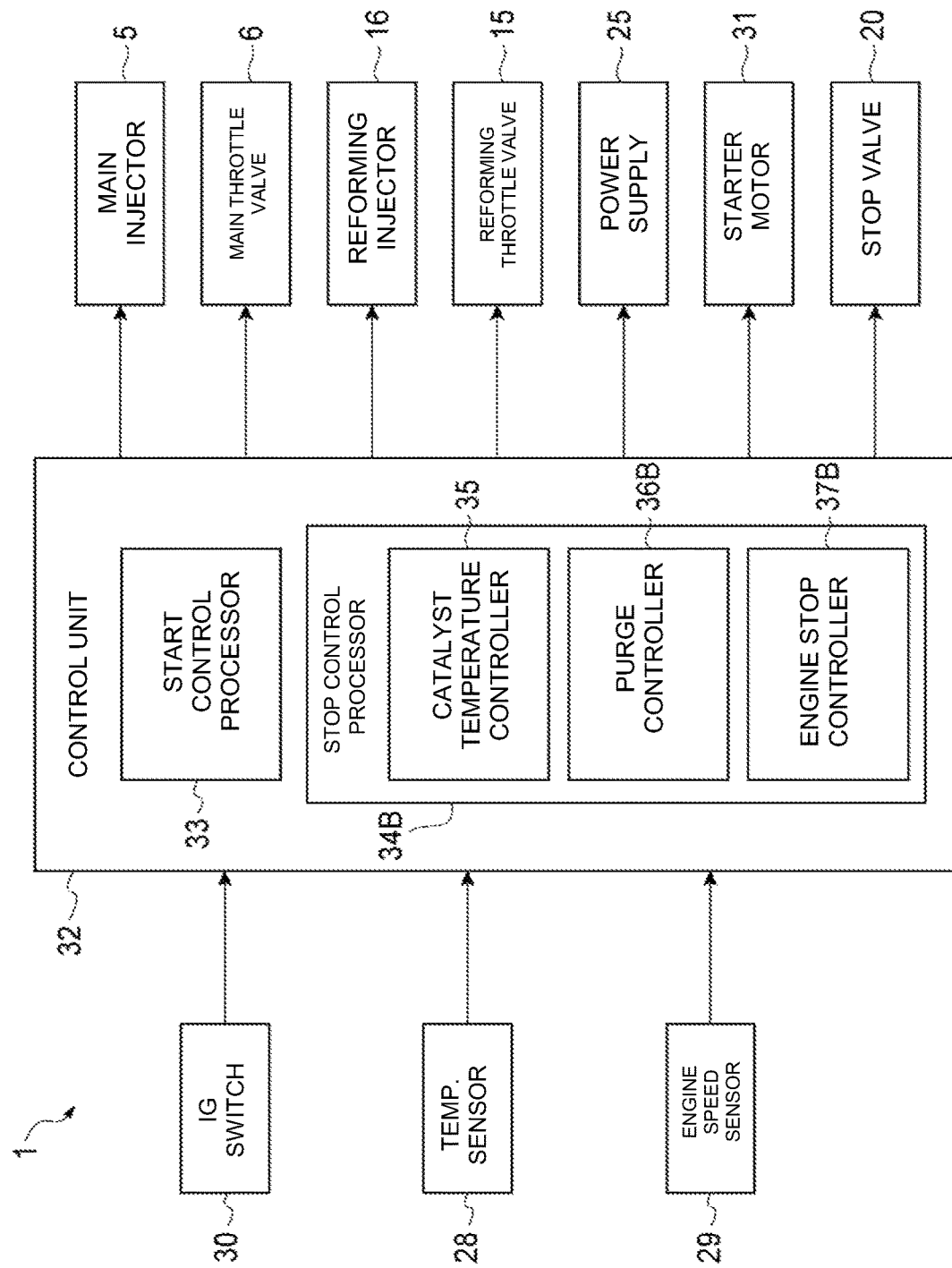
FIG. 8 is a block diagram, illustrating a configuration of a control system of the engine system illustrated in FIG. 7.

As illustrated in FIG. 8, the control unit 32 includes a stop control processor 34B, instead of the stop control processor 34 of the above-described first embodiment. The stop control processor 34B includes the catalyst temperature controller 35, a purge controller 36B, and an engine stop controller 37B.

The purge controller 36B executes a control process in which the main throttle valve 6 and the reforming throttle valve 15 are closed, and the reforming injector 16 is opened, after the ignition switch 30 gives the instruction of the stop of the ammonia engine 2, and after the catalyst temperature controller 35 executes the control process, when the temperature of the reforming device 13 detected by the temperature sensor 28 is equal to or lower than a predetermined temperature.

After the purge controller 36B executes the above-described control process, the engine stop controller 37B controls the main injectors 5 and the reforming injector 16 so as to be closed. The engine stop controller 37B controls the main injectors 5 and the reforming injector 16 so as to be closed, and then controls the stop valve 20 so as to be closed and controls the main throttle valve 6 so as to be opened.

Figure 9:
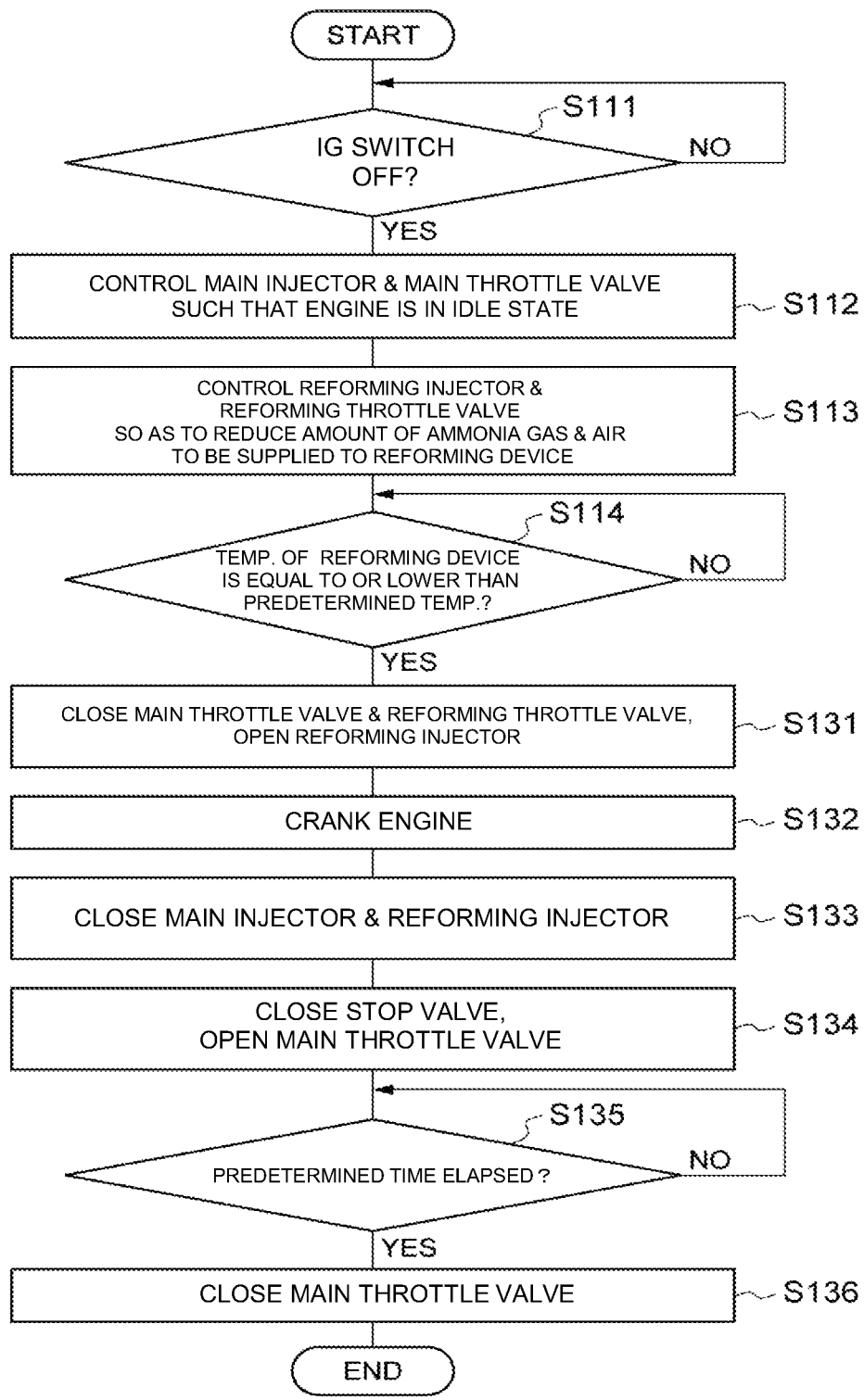
FIG. 9 is a flowchart, illustrating details of steps of stop control processes executed by a stop control processor illustrated in FIG. 8.

FIG. 9 is a flowchart, illustrating details of steps of control processes executed by the stop control processor 34B. Before execution of the control process, the main injectors 5, the main throttle valve 6, the reforming throttle valve 15, the reforming injector 16, and the stop valve 20 are in an opened state.

In FIG. 9, the stop control processor 34B sequentially executes the Steps S111 to S114 in the same manner as the stop control processor 34 in the above-described first embodiment. When the stop control processor 34B determines that the temperature of the reforming device 13 detected by the temperature sensor 28 in the Step S114 is equal to or lower than the predetermined temperature (Step S114: YES), the stop control processor 34B controls the main throttle valve 6 and the reforming throttle valve 15 so as to be closed and also controls the reforming injector 16 so as to be opened (Step S131). At this time, the stop control processor 34B controls, for example, the reforming throttle valve 15 and the main throttle valve 6 so as to be fully closed. As a result, supply of air to the ammonia engine 2 and the reforming device 13 is stopped.

The stop control processor 34B controls the starter motor 31 such that the ammonia engine 2 is cranked by the predetermined number of rotations (Step S132). The predetermined number of rotations, by which gas within the reformer passage 26 can be replaced with ammonia gas, can be calculated from the displacement of the ammonia engine 2, the volume of the reformer passage 26, and the like.

Then, the stop control processor 34B controls the main injectors 5 and the reforming injector 16 so as to be closed (Step S133). At this time, the stop control processor 34B controls, for example, the main injectors 5 and the reforming injector 16 so as to be fully closed. This allows supply of ammonia gas to the ammonia engine 2 and the reforming device 13 to be stopped.

Subsequently, the stop control processor 34B controls the stop valve 20 so as to be closed and also controls the main throttle valve 6 so as to be opened (Step S134). Thus, air is supplied to the ammonia engine 2.

Then, the stop control processor 34B determines whether a predetermined time has elapsed after controlling the main throttle valve 6 so as to be opened (Step S135). When the stop control processor 34B determines that the predetermined time has not elapsed (Step S135: NO), the stop control processor 34B executes the Step S135 again. When the stop control processor 34B determines that the predetermined time has elapsed (Step S135: YES), the stop control processor 34B controls the main throttle valve 6 so as to be closed (Step S136). At this time, the stop control processor 34B controls, for example, the main throttle valve 6 so as to be fully closed. This allows supply of air to the ammonia engine 2 to be stopped.

Here, the purge controller 36B executes the Steps S114, S131, and S132. The engine stop controller 37B executes the Steps S133 to S136.

In the above-described engine system 1, when the ignition switch 30 is turned OFF, the ammonia engine 2 is in the idle state, which further reduces the amounts of ammonia gas and air to be supplied to the reforming device 13. This leads to a decrease in the temperature of the reforming catalyst 13b of the reforming device 13.

When the temperature of the reforming device 13 decreases to a predetermined temperature, the main throttle valve 6 and the reforming throttle valve 15 are closed, so that air is not supplied to the combustion chambers 2a of the ammonia engine 2 and the reforming device 13. The starter motor 31 cranks the ammonia engine 2 by the predetermined number of rotations. As a result, the inside of the reformer passage 26 is purged by ammonia gas.

After that, the main injectors 5 and the reforming injector 16 are closed, so that ammonia gas is not supplied to the combustion chambers 2a of the ammonia engine 2 and the reforming device 13. Therefore, the ammonia engine 2 is rotated by inertia.

Then, the stop valve 20 is closed and the main throttle valve 6 is opened, so that air is supplied to the combustion chambers 2a of the ammonia engine 2. As a result, ammonia gas existing in the reformed gas flow passage 18 and the intake passage 3 between the stop valve 20 and the combustion chambers 2a is scavenged by air.

Here, in a process in which the inside of the reformer passage 26 is purged by ammonia gas, and in a process in which ammonia gas is scavenged by air, ammonia gas exhausted from the ammonia engine 2 is physically adsorbed onto an adsorbent of the SCR catalyst 8b. At this time, the amount of adsorbent is set such that the amount of exhausted ammonia gas is within a range where the adsorbent can adsorb ammonia gas. This can prevent leakage of ammonia gas to the outside of the system.

As described above, also in the present embodiment, at a stop of the ammonia engine 2, steam does not exist in the reformer passage 26 because the inside of the reformer passage 26 is purged. This can prevent condensation of steam remaining in the reformer passage 26.

In the present embodiment, supply of air to the ammonia engine 2 and the reforming device 13 is stopped after the instruction of the stop of the ammonia engine 2. Therefore, the inside of the reformer passage 26 is purged by ammonia gas. After that, supply of ammonia gas to the ammonia engine 2 and the reforming device 13 is stopped, so that the ammonia engine 2 is stopped. Since the ammonia engine 2 is stopped after purging of the inside of the reformer passage 26 in this manner, condensation of steam remaining in the reformer passage 26 is prevented without discomfort of a driver in a vehicle.

In the present embodiment, air is supplied to the ammonia engine 2 after completion of purging in the reformer passage 26 by ammonia gas. Therefore, ammonia existing between the stop valve 20 and the ammonia engine 2 is purged by air, due to residual rotations when the ammonia engine 2 stops. This can prevent disagreeable odor and the like caused by ammonia gas, in the intake passage 3 and the reformed gas flow passage 18.

In the present embodiment, the main throttle valve 6 and the reforming throttle valve 15 are controlled so as to be closed, and the ammonia engine 2 is cranked by the predetermined number of rotations, but other control processes are acceptable. The ammonia engine 2 need not be cranked as long as the inside of the reformer passage 26 can be purged by inertial rotations of the ammonia engine 2 due to a stop of supply of air to the ammonia engine 2.

In the present embodiment, in the Steps S131, S133 and S136, the opening degrees need not be fully closed as long as the stop control processor 34B controls the main throttle valve 6, the reforming throttle valve 15, the main injectors 5, and the reforming injector 16 so as to be closed.

Although the embodiments of the present invention have been described above, the present invention is not limited thereto. For example, in both the first and second embodiments, the stop valve 20 may be disposed in the reformed gas flow passage 18, similarly to the third embodiment.

In the above-described embodiments, although the plurality of main injectors 5 for injecting ammonia gas into each combustion chamber 2a of the ammonia engine 2 are mounted to the ammonia engine 2, one main injector 5 may be sufficient. In this case, the one main injector 5 may be disposed so as to inject ammonia gas toward a part of the intake passage 3, specifically between the main throttle valve 6 and the ammonia engine 2, or may be disposed so as to inject ammonia gas toward a part of the intake passage 3 upstream of the main throttle valve 6 in the intake passage 3.

In the above-described embodiments, the electric heater 17 heats ammonia gas to be supplied to the reforming device 13 to increase the temperature of the reforming device 13 through ammonia gas, but other configurations are acceptable. The electric heater 17 may directly increase the temperature of the reforming device 13 by directly heating the reforming device 13. Alternatively, a combustion-type heater for heating by burning ammonia may be used.

In the above-described embodiments, the temperature of the reforming device 13 is detected by the temperature sensor 28, but other configurations are acceptable. The temperature of the reforming device 13 may be estimated from the flow rate of ammonia gas, the flow rate of air, time, a room temperature, and the like.

In the above-described embodiments, the air flow passage 14 through which air to be supplied to the reforming device 13 flows, is connected to and branches off from the intake passage 3, but other configurations are acceptable. Air may be supplied to the air flow passage 14 from a passage different from the intake passage 3 connected to the ammonia engine 2. In this case, an influence of pulsation of the intake passage 3 can be prevented.

In the above-described embodiments, the reforming injector 16 for injecting ammonia gas toward the reforming device 13 is connected to the ammonia gas flow passage 21, but other configurations are acceptable. Instead of the reforming injector 16, a flow regulating valve may be used. In this case, the other end of the ammonia gas flow passage 21 is connected to the air flow passage 14, and also the flow regulating valve (fuel supply valve) is disposed in the ammonia gas flow passage 21. The flow regulating valve allows ammonia gas to be continuously supplied to the reforming device 13.

In the above-described embodiments, the other end of the reformed gas flow passage 18 is connected to the intake passage 3, but other configurations are acceptable. For example, an injector for injecting reformed gas toward the ammonia engine 2 or the intake passage 3 may be provided on the other end of the reformed gas flow passage 18.

In the above-described embodiments, although ammonia is used as a fuel to be supplied to the ammonia engine 2 and the reforming device 13, the fuel to be used is not limited to ammonia. Alcohol-based substances such as ethanol may be used as the fuel.

Although the engine system of the above-described embodiments is mounted on a vehicle with an engine, the present invention is also applicable to a hybrid vehicle, for example.

REFERENCE SIGNS LIST 1 engine system
2 ammonia engine (engine)
3 intake passage
5 main injector (fuel injection valve)
6 main throttle valve (first throttle valve)

13 reforming device (reformer)
13b reforming catalyst (catalyst)
14 air flow passage
15 reforming throttle valve (second throttle valve)
16 reforming injector (fuel supply valve)
18 reformed gas flow passage
20 stop valve
26 reformer passage
28 temperature sensor (temperature detector)
30 ignition switch (stop instruction member)
31 starter motor (motor)
32 control unit
35 catalyst temperature controller (third controller)
36, 36A, 36B purge controller (first controller)
37, 37A, 37B engine stop controller (second controller)

The invention claimed is:

1. An engine system comprising:
an engine;
an intake passage through which air to be supplied to the engine flows;
a fuel injection valve configured to inject a fuel toward the engine;
a first throttle valve disposed in the intake passage and configured to control a flow rate of the air to be supplied to the engine;
a reformer that has a catalyst for cracking the fuel into hydrogen and configured to reform the fuel to generate reformed gas containing hydrogen;
an air flow passage through which air to be supplied to the reformer flows;
a fuel supply valve configured to supply the fuel to the reformer;
a second throttle valve disposed in the air flow passage and configured to control a flow rate of the air to be supplied to the reformer;
a reformed gas flow passage through which the reformed gas generated by the reformer flows toward the engine;
a stop instruction processor configured to give an instruction of a stop of the engine; and
a processor configured to control the fuel injection valve, the first throttle valve, the fuel supply valve, and the second throttle valve, wherein,
the processor includes:
a first processor configured to execute a first control process in which one of the fuel supply valve and the second throttle valve is closed, and the other one of the fuel supply valve and the second throttle valve is opened, after the stop instruction processor gives the instruction of the stop of the engine; and
a second processor configured to execute a second control process in which the fuel injection valve is closed, after the stop instruction processor gives the instruction of the stop of the engine,
a third processor configured to execute a fourth control process in which the fuel supply valve and the second throttle valve are controlled such that amounts of fuel and air to be supplied to the reformer are reduced, when the stop instruction processor gives the instruction of the stop of the engine, before each of the first processor and the second processor executes the first control process and the second control process, respectively.

2. The engine system according to claim 1, wherein
the second processor executes a third control process in which the fuel injection valve and the first throttle valve are closed, and the other one of the fuel supply valve and the second throttle valve is closed, after the first processor executes the first control process.

3. The engine system according to claim 2, further comprising a temperature detector configured to detect a temperature of the reformer, wherein
the first processor executes a fifth control process in which the fuel supply valve is closed and the second throttle valve is opened when the temperature of the reformer detected by the temperature detector is equal to or lower than a predetermined temperature, after the third processor executes the fourth control process, wherein
the second processor executes a sixth control process in which the fuel injection valve and the first throttle valve are closed and the second throttle valve is closed, after the first processor executes the fifth control process.

4. The engine system according to claim 3, wherein
the second processor executes the seventh control process in which the fuel injection valve and the first throttle valve are closed and the second throttle valve is closed, after a lapse of a predetermined time from execution of the fifth control process by the first processor.

5. The engine system according to claim 1, wherein
the second processor executes an eighth control process in which the fuel injection valve and the fuel supply valve are closed, after the stop instruction processor gives the instruction of the stop of the engine, wherein
the first processor executes a ninth control process in which the fuel supply valve is closed and the first throttle valve and the second throttle valve are opened, after the second processor executes the second control process.

6. The engine system according to claim 5, further comprising
a motor configured to start the engine, wherein
the first processor executes a tenth control process in which the first throttle valve and the second throttle valve are opened and the motor is controlled such that the engine is cranked by a predetermined number of rotations, after the second processor executes the second control process.

7. The engine system according to claim 6, further comprising
a temperature detector configured to detect a temperature of the reformer, wherein
the second processor executes an eleventh control process in which the fuel injection valve and the fuel supply valve are closed when the temperature of the reformer detected by the temperature detector is equal to or lower than a predetermined temperature, after the third processor executes the fourth control process.

8. The engine system according to claim 1, wherein
the first processor executes a twelfth control process in which the first throttle valve and the second throttle valve are closed and the fuel supply valve is opened, after the stop instruction processor gives the instruction of the stop of the engine, wherein
the second processor executes a thirteenth control process in which the fuel injection valve and the fuel supply valve are closed, after the first processor executes the twelfth control process.

9. The engine system according to claim 8, further comprising
a stop valve configured to open and close the reformed gas flow passage, wherein
the second processor executes a fourteenth control process in which the fuel injection valve and the fuel supply valve are closed, the stop valve is then closed, and the first throttle valve is also opened.

10. The engine system according to claim 8 further comprising
a temperature detector configured to detect a temperature of the reformer, wherein
the first processor executes a fifteenth control process in which the first throttle valve and the second throttle valve are closed and the fuel supply valve is opened when the temperature of the reformer detected by the temperature detector is equal to or lower than a predetermined temperature, after the third processor executes the fourth control process.

11. The engine system according to claim 1, wherein
the engine is an ammonia engine using ammonia as the fuel.

* * * * *